Aug. 13, 1957 N. C. STURDY 2,802,318
JOINTER BLADE SHARPENER
Filed July 12, 1955 2 Sheets-Sheet 1

Norris C. Sturdy
INVENTOR.

BY

Aug. 13, 1957 N. C. STURDY 2,802,318
JOINTER BLADE SHARPENER
Filed July 12, 1955 2 Sheets-Sheet 2
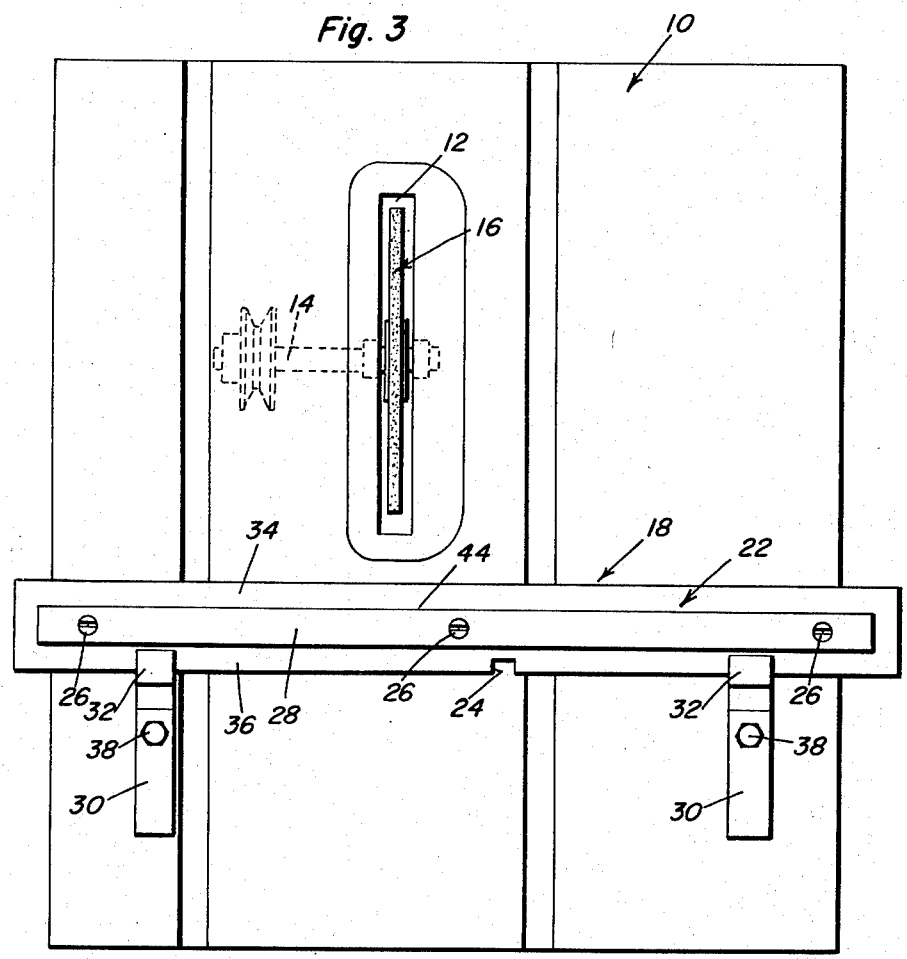
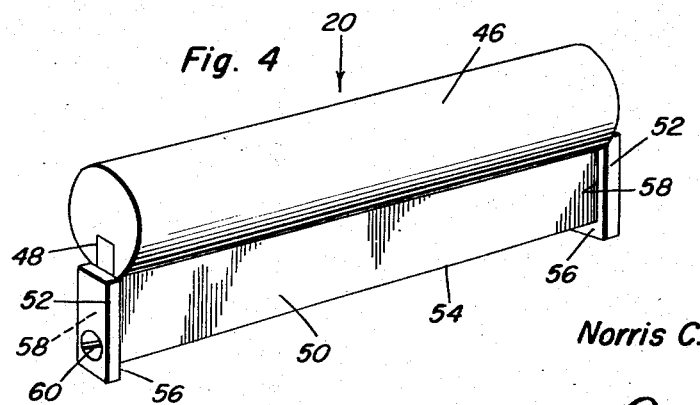
Norris C. Sturdy
INVENTOR.

United States Patent Office 2,802,318
Patented Aug. 13, 1957

2,802,318

JOINTER BLADE SHARPENER

Norris C. Sturdy, Mount Vernon, Wash.

Application July 12, 1955, Serial No. 521,449

1 Claim. (Cl. 51—231)

This invention relates generally to tool sharpening attachments and is more particularly directed to a jointer blade sharpener which is utilized with a grinding wheel rotatably mounted on the driving shaft of a saw table wherein said attachment permits relatively easy sharpening to provide an effective and uniform cutting edge on a jointer blade and requiring the minimum of experience and effort.

A further object of invention in conformance with that set forth above is to provide a jointer blade attachment for a saw blade table cooperating with a grinding wheel mounted on the arbor of a saw blade and incorporating therewith means for readily securing the jointer blade in a handle attachment to cooperate with means for guiding the jointer blade in a uniform transverse path relative to the grinding wheel for obtaining a satisfactory and uniform cutting edge on said cutter blade.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a top plan view similar to Figure 1 illustrating the guide bar in an alternate position for accommodating jointer blades of longer lengths; and Figure 4 is a perspective view of the novel jointer blade holder utilized with the sharpener attachment.

Figure 1:
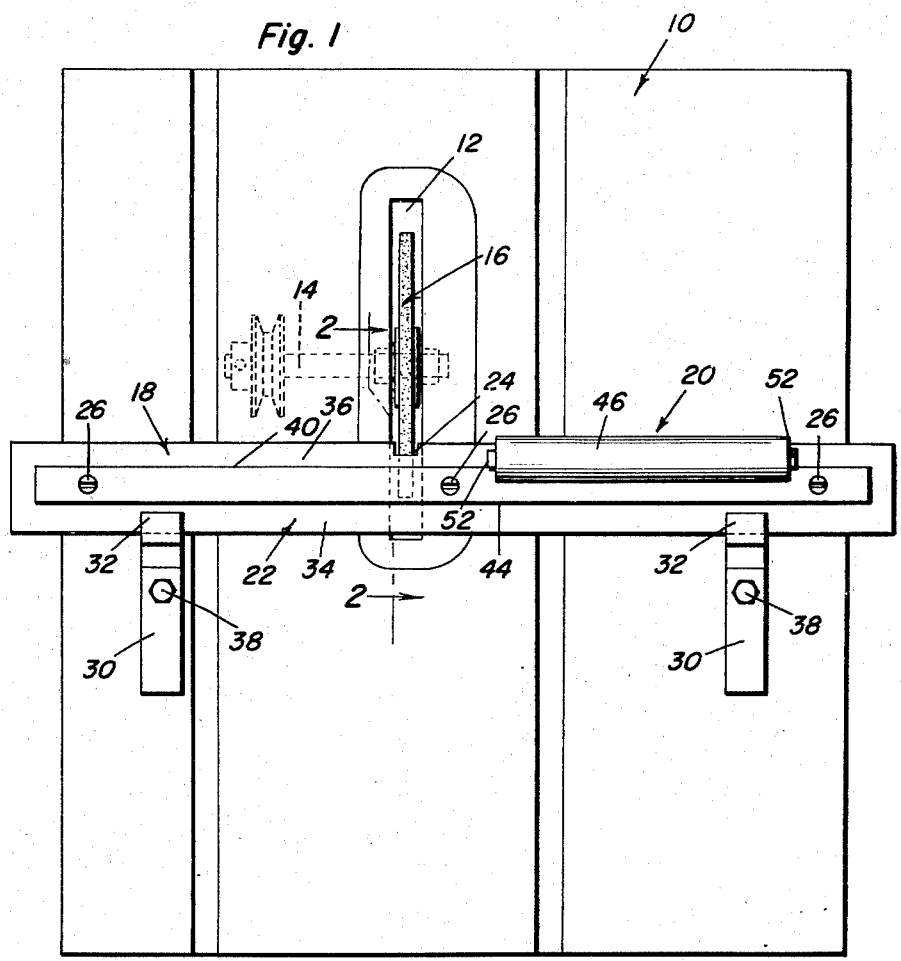
Figure 1 is a plan view illustrating a grinding wheel mounted on a circle saw arbor and illustrating the relative position of the jointer sharpening blade attachment and the holder attachment for the jointer blade.

Indicated at 10 is a conventional circular saw table top which includes a slotted portion 12, and a rotating driven arbor 14 upon which is mounted in any suitable manner, in place of a circular saw blade a grind wheel 16 of any suitable character.

Extending transversely of the saw table is a jointer blade guide bar assembly 18 which has cooperating therewith a jointer blade holder assembly 20.

The guide bar assembly 18 includes a base plate 22 which extends across the entire width of the saw blade table, said base plate including a centrally located notched out portion 24 which extends on both sides of the grinding wheel 16, see Figure 1, said base plate having secured on the upper portion thereof by means of countersunk screws 26, for example, a guide plate 28. The base and guide plates may be constructed of any suitable material, however, it is generally desirable to have these parts constructed of steel sufficient to retain a machined edge for the purpose of obtaining true sharpened edges on the jointer blade to be subsequently described.

The base plate is clamped to the saw table by means of clamp members 30, said clamp members including an overhanging flange portion 32 which is engageable with either of the top surfaces 34 or 36 of the base plate 22, as seen in Figures 1 and 3, respectively. It will be noted that clamp elements 30 may be retained on the saw table by means of suitable bolts 38 which are threaded into suitably formed threaded apertures in the saw table (not shown).

Figure 2:
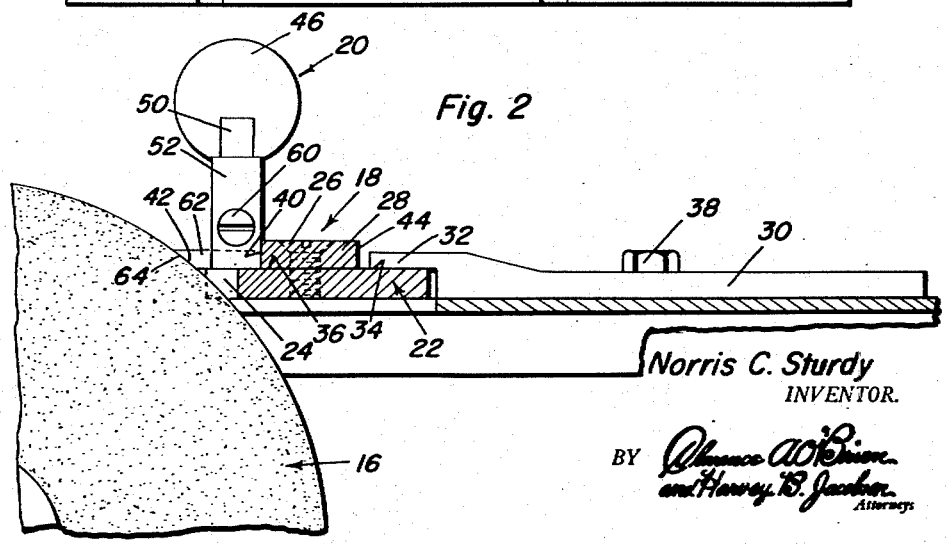
Figure 2 is an enlarged sectional view taken substantially on line 2—2 of Figure 1.

As is seen Figure 1, the jointer blade resting against the edge 40 of the guide bar 28 and against the upper surface 36 of the base plate 22 may be reciprocated transversely to the rotating grinding wheel 16, and as seen in Figure 2, the portion of the grinding wheel extending into the notch 24 of the base plate 22 will contact the jointer blade at 42, as seen in Figure 2, and accordingly a uniform cutting edge may be formed thereon. The base plate 22 may be rotated 180° as seen in Figure 3, and thus the upper surface 34 of the base plate and the edge 44 of the guide bar will be available to present an uninterrupted edge for larger blades which may be reciprocated transversely to the peripheral grinding edge of the grind wheel 16.

The jointer blade holder assembly 20 includes a handle 46 which may be wood or any suitable material, said handle having a longitudinally extending groove 48 containing therein an outwardly extending integrally joined plate 50, said plate being of the approximate length of the jointer blade to be sharpened. Secured on opposite ends of the plate 50 are retaining elements 52 which extend below the lower edge 54 of the plate to afford a gripping portion 56. The gripping elements 52 include vertical notched out inner portions 58 which embrace the ends of the plate 50, said retaining elements being secured to the ends of the plate 50 by means of suitable fasteners, such as screws 60. A jointer blade 62, as seen in Figure 2, is secured between portions 56 of the retaining elements 52 and the cutting edge 64 will be sharpened when the jointer blade retained in the jointer blade holder assembly 20 is reciprocated along the base plate 22, as previously described, it being readily apparent that the sharpening device may be readily utilized by a person without an excessive amount of experience or skill in the sharpening of tools.

Inasmuch as a jointer includes three similar blades when utilizing the apparatus heretofore set forth similar parts of each blade will be ground for any single setting of the grinding wheel, in this manner equal dimensions and balance will be maintained between the similar blades.

It is thus believed readily apparent that there has been disclosed a jointer blade cutter attachment and jointer blade holder which fully conform with the objects of invention heretofore set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

Means for moving jointer blades across a sharpening wheel projecting upwardly from a table comprising a base plate adapted to extend across said table to slidably support jointer blades for movement across said wheel and provided with a relatively narrower longitudinally extending blade guiding bar fixed thereon in spaced relation to opposite sides of the plate to provide top faces on said plate at opposite sides of said bar for slidably guiding jointer blades of different widths across said wheel, said plate being reversible side for side on said table to position either top face opposite said wheel and having in one side a vertical notch opening onto one top face for straddling said wheel to engage jointer blades on said one face narrower than said one face with said wheel, the other side of said plate being uninterrupted for spacing from said wheel to engage jointer blades on said other top face wider than and overhanging the same with said wheel, clamping means for securing said plate to said table in reversed positions, and a handle member for sliding said blades having opposite depending clamping elements thereon clampingly engageable with opposite ends of a jointer blade in straddling relation to the blade.

References Cited in the file of this patent

UNITED STATES PATENTS

| | | |
|---|---|---|
| 686,339 | Ritchie | Nov. 12, 1901 |
| 2,052,837 | Makaroff | Sept. 1, 1936 |
| 2,579,680 | Leighton | Dec. 25, 1951 |
| 2,636,326 | Rivard | Apr. 28, 1953 |

FOREIGN PATENTS

| | | |
|---|---|---|
| 4,410 | Netherlands | Sept. 19, 1919 |